(12) United States Patent
Toub et al.

(10) Patent No.: US 6,674,450 B1
(45) Date of Patent: Jan. 6, 2004

(54) INTERACTIVE DATA-BOUND CONTROL

(75) Inventors: Joshua B. Toub, Austin, TX (US); Ben C. Gawiser, Austin, TX (US)

(73) Assignee: Trilogy Development Group, Inc., Austin, TX (US)

(*) Notice: Subject to any disclaimer, the term of this patent is extended or adjusted under 35 U.S.C. 154(b) by 0 days.

(21) Appl. No.: 09/567,303

(22) Filed: May 8, 2000

Related U.S. Application Data (63) Continuation-in-part of application No. 09/549,270, filed on Apr. 14, 2000, now abandoned.

(51) Int. Cl.[7] .......................... G06F 3/00; G06F 17/30; G06F 15/163
(52) U.S. Cl. ................ 345/749; 345/740; 345/760; 345/968; 707/10; 707/201; 715/513; 709/203; 709/331
(58) Field of Search .................. 345/733, 760, 345/740, 748, 749, 764, 810, 835, 840, 846, 856, 862, 860, 968; 709/203, 201, 208, 213, 216, 217, 219, 331, 332, 318, 319; 707/10, 201, 204, 200; 715/513

(56) References Cited

U.S. PATENT DOCUMENTS

| | | | | |
|---|---|---|---|---|
| 5,754,830 A | * | 5/1998 | Butts et al. ............ | 709/203 X |
| 5,909,545 A | * | 6/1999 | Frese, II et al. ............ | 709/208 |
| 6,054,983 A | * | 4/2000 | Simonoff et al. ....... | 709/203 X |
| 6,131,116 A | * | 10/2000 | Riggins et al. ............. | 709/219 |
| 6,253,228 B1 | * | 6/2001 | Ferris et al. ................ | 709/203 |
| 6,351,776 B1 | * | 2/2002 | O'Brien et al. ........... | 707/10 X |

* cited by examiner

*Primary Examiner*—Raymond J. Bayerl
(74) *Attorney, Agent, or Firm*—Hamilton & Terrile, LLP

(57) ABSTRACT

A computer system including a server computer system and a client computer system connected to one another over a computer network, such as the Internet, so that graphical controls displayed and able to be manipulated by a user on the client computer system correspond to data stored on the server computer system. When the user makes changes to the graphical controls, the corresponding data is changed on the server computer system. The interactive graphical control binds the data on the server computer system to the graphic controls displayed on the client computer system without use of additional plug-in or other compiled code on the client computer system other than standard browser software such as Microsoft Explorer or Netscape Navigator.

31 Claims, 9 Drawing Sheets

Microfiche Appendix Included
(2 Microfiche, 110 Pages)

INTERACTIVE DATA-BOUND CONTROL

CROSS-REFERENCE TO RELATED APPLICATIONS

This application is continuation-in-part of patent application Ser. No. 09/549,270 filed Apr. 14, 2000, now abandoned, entitled "INTERACTIVE DATA-BOUND CONTROL," having Joshua B. Toub and Ben C. Gawiser as inventors. This application is assigned to Trilogy Development Group, Inc., the assignee of the present invention, and is hereby incorporated herein by reference, in its entirety and for all purposes.

MICROFICHE APPENDIX

This application includes a microfiche appendix containing two (2) microfiche and one hundred ten (110) total frames and is incorporated herein in its entirety by reference.

Partial Waiver of Copyright

All of the material in this patent application is subject to copyright protection under the copyright laws of the United States of America and of other countries. As of the first effective filing date of this application, this material is protected as unpublished material. However, permission to copy this material is hereby granted to the extent that the copyright owner has no objection to the facsimile reproduction by anyone of the patent documentation or the patent disclosure, including the microfiche appendix, as it appears in the United States Patent and Trademark Office patent file or records but otherwise reserves all copyright rights whatsoever.

BACKGROUND

1. Field of the Invention

This invention relates to a computer network and computer software for interactively manipulating a control, particularly a graphical control in a client-server environment.

2. Description of the Related Art

Graphical controls are used in a variety of software programs ("software") allowing a user to interact with the software by using a pointer (i.e., a mouse, touch pad, etc.) and manipulating or selecting a graphical control displayed on the user's display screen. The graphical control is often linked to data stored on the computer system. When the user manipulates the graphical control, the corresponding data is also updated without the user having to manually enter the data. For example, a Gantt chart uses graphical bars to represent underlying task data such as start date, duration, resources, etc. In a Gantt chart example, the user is presented with an interactive Gantt interface which enables the user to actually edit the underlying task structure by using the mouse pointer to modify the layout of the bars in the Gantt chart (i.e., stretching a bar to represent an increase in duration, moving a bar to change the scheduling order, etc.). This method of data presentation and manipulation has proven to be an intuitive and efficient process for user interaction and modification of the underlying data.

An increasingly popular feature for enterprise based system applications is to provide some subset of the application's functionality through a browser-based interface that can be used to gain access to data via the Internet; World Wide Web (the Web) portion of the Internet, extranets, or other computer network. In a network setting, the data often resides on a common server so that it can be shared with more than one user. The users' computer systems (clients) access the data residing on the server from separate computer systems connected to a computer network common to both the server computer system and the client computer systems. The client computer systems display graphical controls to the users representative of the data residing on the server computer system.

A challenge using a browser-based interface is being able to provide web-based data manipulation controls that require minimal resources on the client computer system. Interactive web-based controls that perform complex tasks have been implemented using Java applet or ActiveX technologies. These technologies require the client computer system to download considerable amounts of compiled code and often expose incompatibilities between browsers. Users are often wary of downloading and executing code from unfamiliar sites on the Internet for convenience, security, and privacy reasons.

Because the compiled code is executed on the client computer system, the user has to first download the necessary code to their computer system before they are able to access and manipulate the controls. When the client-based code changes, the user downloads updated versions of the code in order to remain compatible with the server-based code. If the web-site is unfamiliar to the user, the user may have security and privacy concerns regarding downloading software from an unfamiliar source. Capturing users' attention on the Web through interactive controls is a challenge to many types of Web-based businesses.

A portable thin-client solution is needed to provide interactive controls without necessitating downloading compiled code to the client computer system.

SUMMARY

In one embodiment of the present invention, a client-server computer system allows the server computer system to store data corresponding to graphical controls, create pages of information to display to the user on the client computer system, and bind the data to the graphical controls so that the user may display the bound data and/or the user may manipulate the graphic control to effectuate a resultant change in the data bound to the graphical controls and stored on the server computer system and/or on the pages of information. The system allows controls to be interactively manipulated by the user and corresponding data on the server modified, without the user needing to install executable software other than standard Internet browser software (i.e., Microsoft Explorer, Netscape Navigator, etc.).

One embodiment of the present invention includes, a Gantt chart comprised of multiple interactive data-bound controls (i.e., task bars within the Gantt chart) that enable the user to manipulate the data corresponding to the various tasks stored on a server computer and/or in a Web page, such as start and finish dates, as well as update the appearance of the actual Gantt chart displayed to the user on the client computer system.

The foregoing is a summary and thus contains, by necessity, simplifications, generalizations and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates similar or identical items.

DESCRIPTION OF THE PREFERRED EMBODIMENT(S)

The following is intended to provide a detailed description of an example of the invention and should not be taken to be limiting of the invention itself. Rather, any number of variations may fall within the scope of the invention that is defined in the claims following the description.

Figure 1:
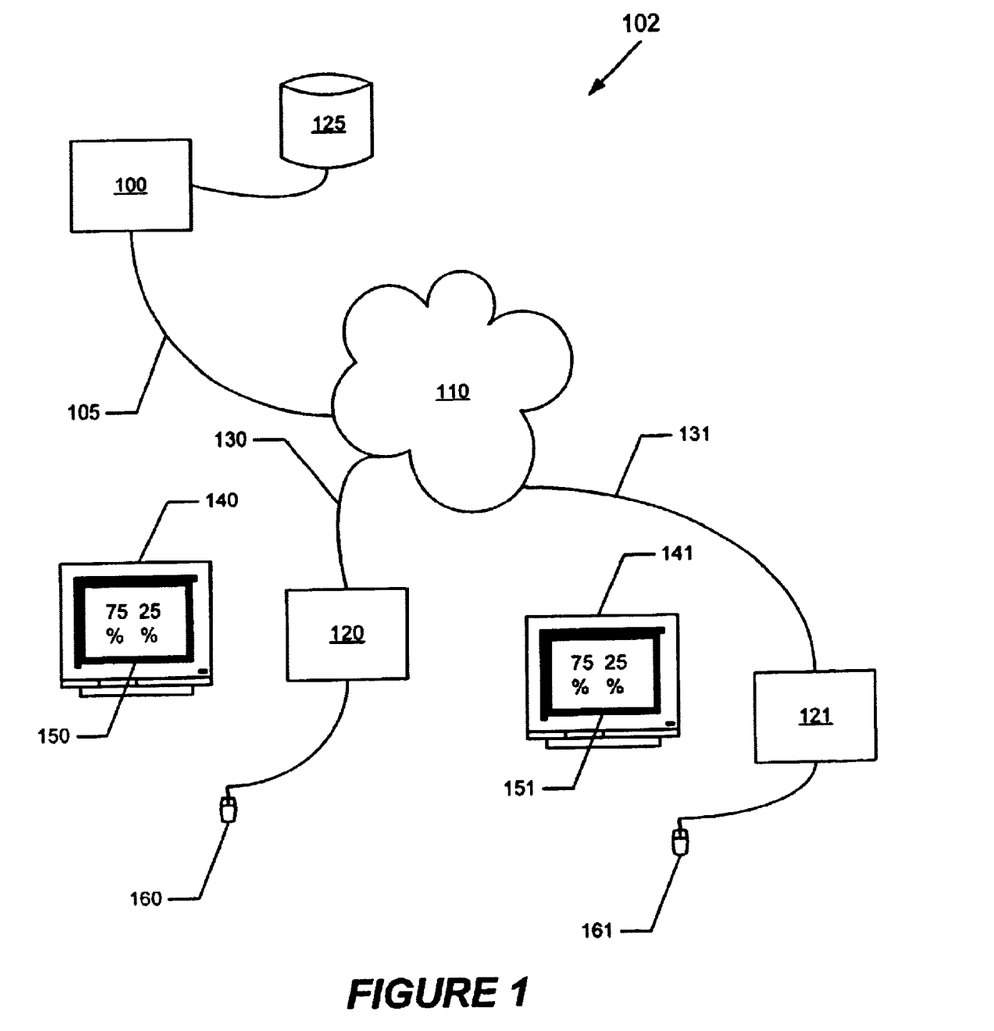
FIG. 1 is a system diagram showing the components interacting over a computer network.

FIG. 1 shows a data processing system 102 having components interacting over a computer network 110 such as the Internet. The server computer 100 is shown connected to the computer network 110 via pathway 105. Pathway 105 may be any of a variety of connections to computer network 110. Pathway 105 can utilize the public switched telephone network in order to transmit signals from server computer 100 to computer network 110. Access to the Internet can also be provided by higher speed ISDN lines, cable modems, dedicated T1 lines, or any number of other conduits. Data processing system 102 can also be implemented on a local area computer network, or LAN, which is sometimes referred to as an "intranet" as opposed to the Internet. In a LAN environment, pathway 105 could be implemented using Ethernet wiring, token-ring wiring, or other types of local area network conduits. While the data processing system 102 can be implemented on a LAN, computer network 110 may often be the Internet because the Internet allows users outside the LAN to communicate with server computer 100. In addition, the "thin" client-side aspect of data processing system 102 allows for standard Internet browsers, such as Netscape's Navigator product or Microsoft's Internet Explorer product, to provide interactive data-bound controls without the user having to install software, often called "plug-ins," on the client computer system. Depending on the size of the organization using server computer 100 to connect to the Internet, the pathway 105 to reach the Internet may include an Internet Service Provider, or "ISP." A smaller organization may not have a direct connection to the Internet and, so, may rely upon an ISP to provide access to the Internet. In such case, the ISP would be part of pathway 105 used by server computer 100 to connect to the Internet 110. In larger organizations, a direct link to the Internet 110 may exist, bypassing the need for an ISP to provide such connection capabilities.

Interactive data-bound controls are related to data 125. Data 125 is often organized in a database management system (DBMS) that provides sophisticated access and editing capabilities. Examples of database management systems include Microsoft Access database, the Oracle database, IBM's DB2 and IMS, and Microsoft's SQL Server. Databases attached to server computer 100 may be implemented on a mainframe computer system, personal computer (i.e., based on the Intel x86 instruction set or on the Apple MacIntosh), or on a midrange computer system. In addition, data 125 may be stored in a "flat file" (i.e., stored in computer files but not in a database management system). Data 125 is connected to server computer 100 in one of several ways. Faster access to data 125 may result by storing data 125 in nonvolatile storage (i.e. a hard drive, etc.) directly coupled to server computer 100. However, for larger, shared databases, data 125 may be stored on a separate computer system that may be dedicated to the database application and providing data over a communication line, such as a LAN, in response to requests received from server computer 100.

In addition to server computer 100, client computer systems 120 and 121 are also shown connected to computer network 110. FIG. 1 depicts two client computer systems but any number of client computer systems may be connected to computer network 110 and communicate with server computer 100. Each client computer system is connected to computer network 110 via a pathway. Client computer system 120 connects to computer network 110 via pathway 130. Pathway 130 used by client computer system 120 may vary as described with respect to pathway 105 used to connect the server computer system 100 to computer network 110. The interactive data-bound control 150 is displayed to the user on computer monitor 140. The interactive data-bound control 150 can represent any display of data, and the representation interactive data-bound control 150 is only one embodiment of such representation. Other example embodiments are set forth below. Pointing device 160, such as a mouse, trackball, graphics pad, directional keyboard keys, or the like, is used by the user to select and manipulate interactive data-bound control 150. The second client computer system 121 is connected to computer network 110 via pathway 131 as discussed for computer system 120 and pathway 130. Likewise, interactive data-bound control 151 is displayed to the second user on computer monitor 141 as discussed for interactive data-bound control 150 and monitor 140. Finally, pointing device 161 is used to select or manipulate interactive data-bound control 151 as described for pointing device 160 and interactive data-bound control 150. Any number of client computer systems can be connected to computer network 110. Each of these client computer systems would include monitors and pointing devices to display and manipulate interactive data-bound controls.

Figure 2:
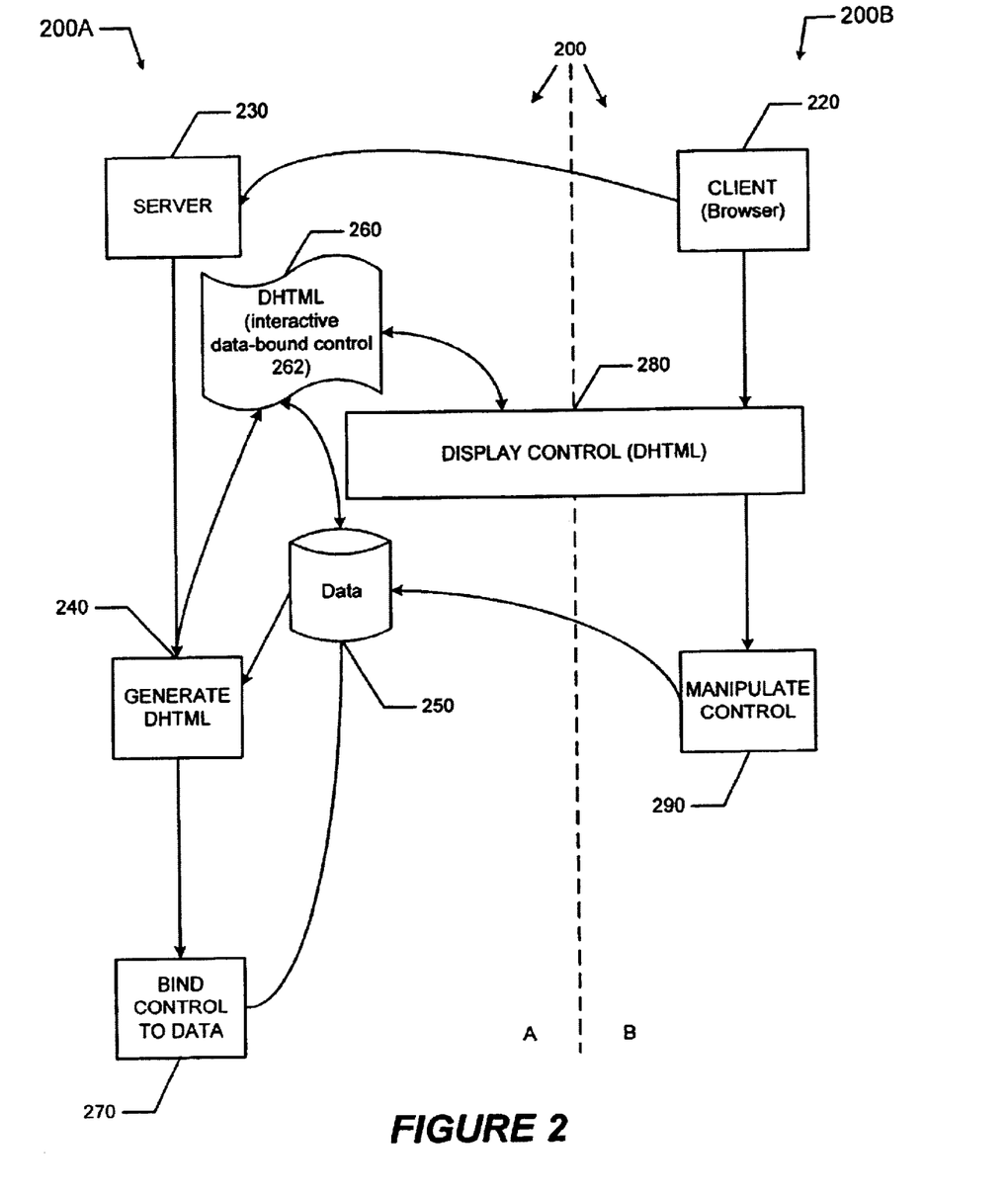
FIG. 2 is a data flow diagram showing the logical components used to assemble the data and transmit data between the client and server machines.

Referring to FIG. 2, interactive data-control operation 200 illustrates the generation of an interactive data-bound control 262 and data flowing between logical components in order to display and process interactive data-bound controls 262 and update date underlying the interactive data-bound control 262. Portion A of FIG. 2 shows server-side operations 200A, and portion B of FIG. 2 shows client-side operations 200B. A user uses a client computer system 220 and logs onto the computer network, such as the Internet, and uses standard browser software (i.e., Netscape Navigator, Microsoft Internet Explorer) to view network data. The client computer system 220 contacts server computer 230 and requests interactive data-bound controls 262. At Generate DHTML operation 240, server computer 230 generates dynamic hypertext markup language code (DHTML) to be sent to client computer system 220 of a user. DHTML is a term given to the web pages that include the combination of HTML (hypertext markup language), Javascript, and cascading style sheets. An example embodiment of the DHTML used to implement interactive data-control operations is set forth in the microfiche appendix of this application. HTML is used as the rendering technology to display render the interactive data-bound control 262, and Javascript provides the interactive functionality. Data 250 that corresponds to the resulting interactive data-bound control is used as input data to Generate DHTML operation 240. Servlet technology is used to dynamically generate DHTML in Generate DHTML operation 240 and used in Bind Control to Data operation 270. During Bind Control to Data operation 270 the interactive data-bound control 262, represented in DHTML 260, is associated (bound) with the Data 250 used to create the interactive data-bound control 262. At Display Control (DHTML) operation 280, DHTML 260 is displayed to the user using the browser program running on the client computer system 220. At Manipulate Control operation 290, the user selects or manipulates the interactive data-bound control 262. When the interactive data-bound control 262 is manipulated, the underlying Data 250 corresponding to the interactive data-bound control 262 is also changed.

The code responsible for user interaction with the interactive data-bound control 262 is contained within a Javascript file referenced by the DHTML page. This code uses the 'event model' within a standard browser (i.e., Microsoft Explorer, Netscape Navigator, etc.). The event model supports DHTML user trap actions (event) within the interactive data-bound control 262, so that the user actions can be translated into a performed operation. When an event occurs, the handler for that event is called by the standard browser. Within the handler, checks are made to determine which element within the interactive data-bound control 262 invoked the event (i.e., modifying a task, scrolling, drilling down, etc.). The present state of the interactive data-bound control 262 is assessed, and, then, the code is executed to effect changes in the layout of the control as appropriate to reflect the user actions. When the browser program recognizes that the representation of underlying Data 250 has been modified, such modification is communicated to the server computer and Data 250 is correspondingly changed so that the graphical representation of Data 250 correlates with the actual underlying Data 250.

Example user actions and handler support include: (1) context sensitive "mouse overs" that display an information window containing details about the interactive data-bound control 262 when the mouse cursor is placed over a control of the interactive data-bound control 262; (2) drag and drop of controls allowing controls to be reordered by clicking on a control and dragging it to a new location; (3) movement of segments allowing controls to be repositioned and joined to one another when placed within the same area on the computer screen; (4) sizing of controls is accomplished by allowing a graphical control to be increased or decreased in size when the cursor is clicked and dragged over an edge of the control; (5) repositioning controls that are comprised of multiple sub-controls while maintaining the internal structure of the internal sub-controls; (6) drilling down to select (e.g. with a mouse cursor) a control that is made up of multiple sub-controls so that the multiple sub-controls are visible and able to be separately manipulated by the user; and (7) scrolling controls. Many of the foregoing handled events are shown in FIGS. 3 through 10.

FIGS. 3 through 10 show example displays interactive data-bound controls from a software application stored in a memory, such as a compact disc, hard drive, floppy disk, or represented as modulated electronic signals, which is accessible by a processor for execution. FIGS. 3 through 10 illustrate examples of the display and manipulation of an interactive data-bound control displayed as a Gantt chart, many other implementations are possible to use interactive data-bound controls to communicate information between two computer systems connected via a computer network.

Figure 6:
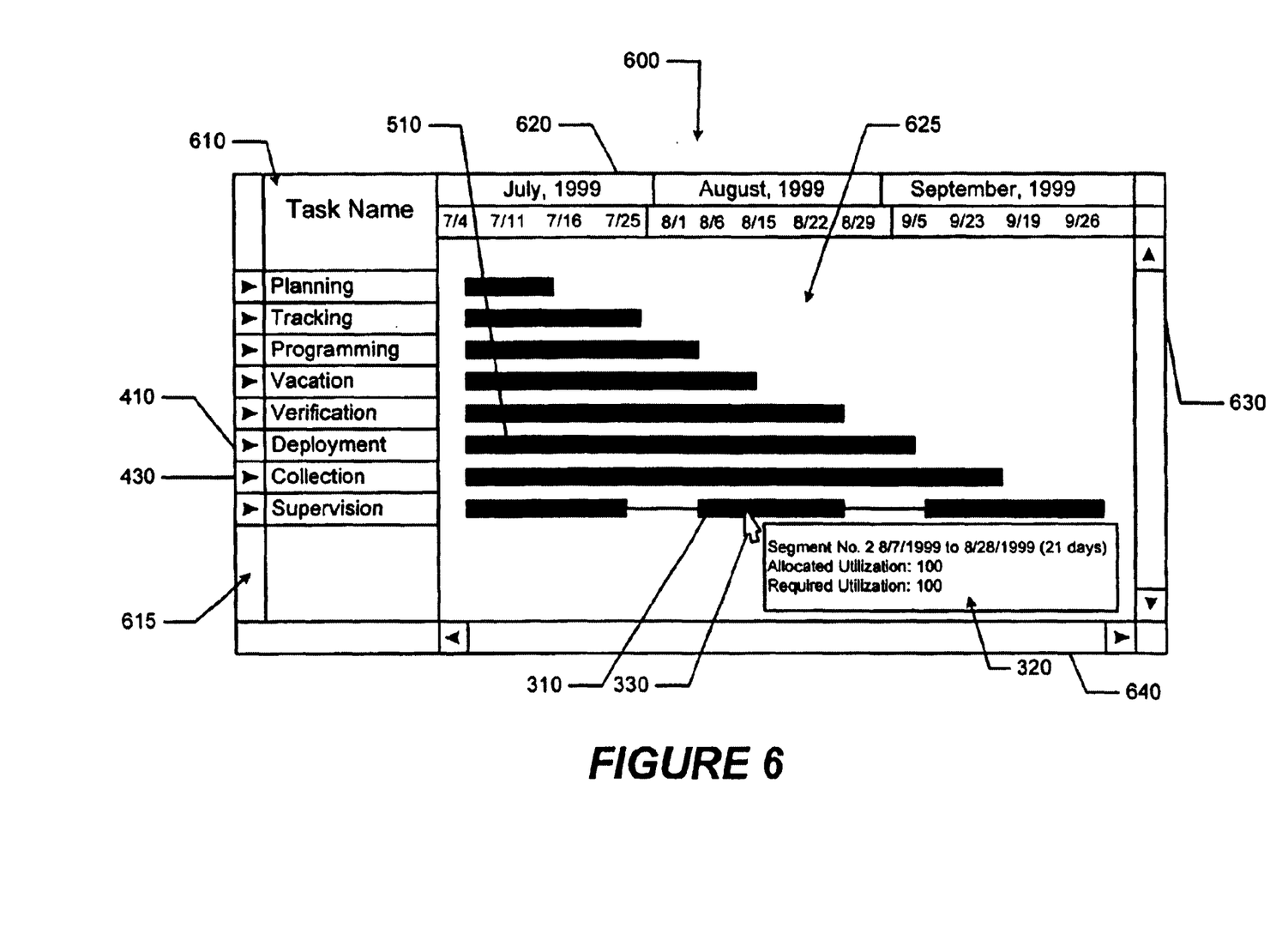
FIG. 6 is a user screen in an example embodiment showing a mouse-over event.

Referring to FIG. 6, the code defining Gantt chart 600 and the display of Gantt chart 600 by a user's client computer illustrate one example of the utilization and value of interactive data-bound control(s). The DHTML code defining Gantt chart 600 is generated and provided to the user's client computer as described with reference to FIG. 2. Gantt chart 600 is defined in part by data which is bound to data embedded in the code defining Gantt chart 600 and/or is bound to data residing on a source server computer which provided the Gantt chart 600 to the user's client computer. Data which is bound to data on a server computer and/or bound to data within the code defining the Gantt chart 600 can be modified by the user's interaction with the Gantt chart 600 interactive controls to correspond to the user's modifications.

Gantt chart 600 displays numerous sub-controls and data. For example, the task name 610 heading displays a number of task names, i.e. Planning, Tracking, Programming, Vacation, Verification, Deployment, Collection, and Supervision. In one example of an interactive data-bound control, if the task names 610 are bound to data on the source server computer, the user could select a specific task name and replace it either with a new entry created by the user or by selecting from a predetermined list of options. In one embodiment as described with reference to FIG. 3, each task name corresponds to a sub-control of Gantt chart 600 which allows additional data about each task name to be displayed and, if such data is bound to underlying data, both the displayed data and underlying data may be interactively modified by the user's manipulation of the corresponding sub-control. In another example of an interactive data-bound control, described in more detail below, of Gantt chart 600, each task bar 310 presents a graphical representation of data related to the duration of each task under task name 610. Each task bar 310 is also an interactive data-bound control in that the user may manipulate each task bar 310 independently to change the displayed duration of a task. Such change in displayed duration represents a change in displayed data, and the data underlying each task bar 310 at the source server computer which is bound to the displayed data is modified, as described with reference to FIG. 2, to correspond to the user's modifications.

Figure 3:
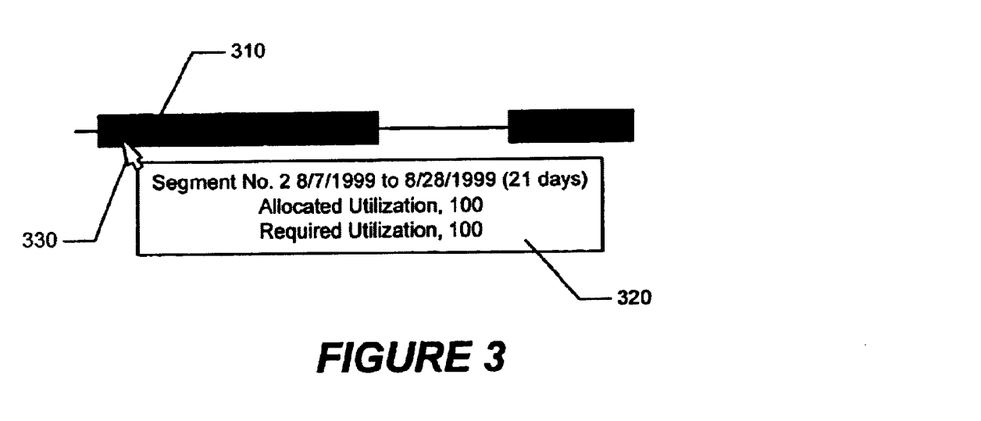
FIG. 3 is a portion of a user screen in an example embodiment depicting a context sensitive mouse-over.

FIG. 3 shows a partial computer screen where floating information window 320 is being displayed. In this example, the user placed mouse cursor 330 over Gantt task bar 310, which is one embodiment of an interactive data-bound control. When mouse cursor 330 is placed over Gantt task bar 310, floating information window 320 is displayed.

Floating information window 320 displays data associated with Gantt task bar 310. In this case, Gantt task bar 310 is actually segment number two and spans from Aug. 7, 1999 to Aug. 28, 1999, a period that spans 21 days. The allocated utilization is shown as being 100 (percent) and the required utilization is shown as being 100 percent as well. By manipulating the task number two duration, for example by decreasing the length of the span, as further described with reference to FIG. 6, the underlying data supporting the displayed data can be correspondingly modified on the source server.

Figure 4:
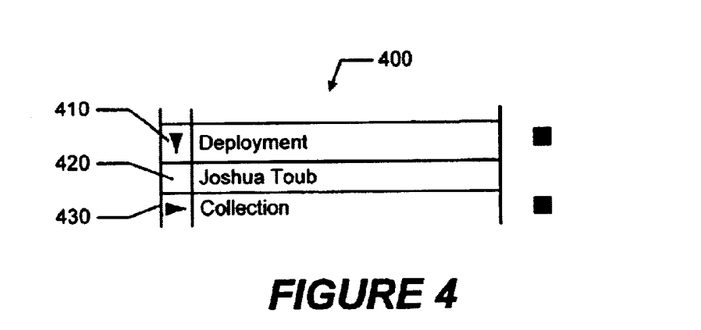
FIG. 4 is a portion of a user screen in an example embodiment depicting a drill-down showing sub-controls contained within a higher level control.

FIG. 4 shows an example of how underlying data associated with Gantt task bar 310 is used to break Gantt task bar 310 down into further subtasks using sub-control features. Task area 400 lists the tasks, such as deployment, associated with a project represented by Gantt task bar 310. In this example, the user has clicked on drill down subtask 410 which is another embodiment of a sub-control of Gantt task bar 310, in order to display subtask data 420 that is associated with task area 400. In this example, the icon displayed to the user is a downward arrow, indicating that subtask data 420 is displayed. Drill down 410 can be toggled so that by pressing the downward arrow icon, subtask data 420 is removed and a rightward arrow, as can be seen by task 430, replaces the downward arrow icon. Task 430 is shown as a rightward arrow icon, so the user knows that in order to display any subtask data 420 associated with task 430, the rightward arrow is pressed to result in a downward arrow and subtask data 420 for task 430 similarly to that shown with subtask data 420. The drill down subtask 410 supporting code can be written in DHTML to allow the user to select subtask data 420 and modify such data by, for example, selecting data from a predetermined menu or making a text entry modification. The user's modifications are communicated between the user's client computer's supporting applications, such as a Web browser, to the server computer so that the server computer will modify the underlying data that is bound to the displayed data.

Figure 5:
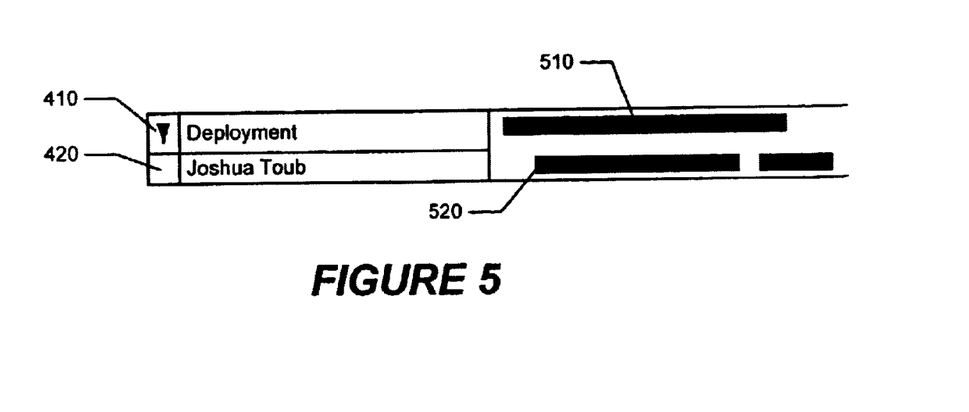
FIG. 5 is a portion of a user screen in an example embodiment depicting the graphic controls associated with a higher level and sub-level control.

In the Gantt interactive data-bound control example shown, resource availability information is associated with the various tasks. FIG. 5 shows resource availability for the subtask shown in FIG. 4. Drill down 410 has been pressed for deployment task bar 510. When drill down 410 is pressed, subtask 420 is shown and a resource usage 520 is displayed. The graphical visualization data assists the user in assigning resources to tasks. The deployment task bar 510 may be modified by user interactive control, for example, by selecting and sliding one, either, or both ends of deployment task bar 510. Once the deployment task bar 310 is modified, the graphical presentation represents new availability data. This new availability data is transferred to the source server, and the source server correspondingly initiates modification of the corresponding data underlying the deployment task bar 510.

Figure 7:
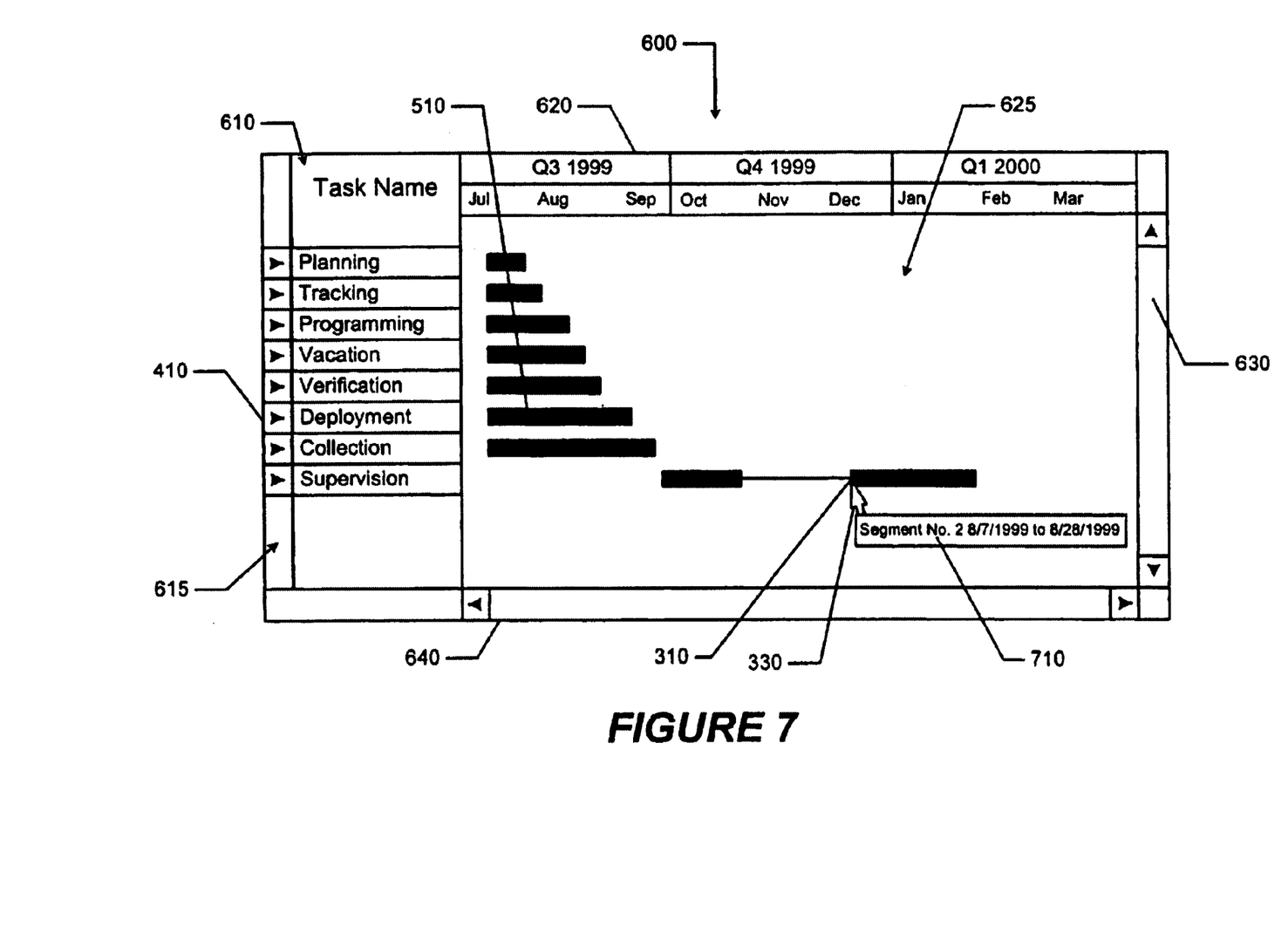
FIG. 7 is a user screen in an example embodiment showing the movement of a control and the data associated with such moved control.

FIG. 6 shows Gantt chart 600 on a computer screen displayed on a client computer showing floating information window 320 in the context of a screen with other Gantt task bars. Task name 610 lists the tasks associated with a particular project. The tasks include planning, tracking, programming, vacation, verification, deployment, collection, and supervision. To the left of task name 610 are drill down icons 615. Each drill down icon from drill down icons 615 corresponds to a task from task name 610. Because the example shown is a Gantt chart, horizontal heading 620 is a date heading showing the dates associated with the project by both month and week. In this view, horizontal heading 620 shows three months, or one calendar quarters, worth of information. The Gantt task bar area 625 is a window containing the Gantt task bars associated with each task shown in task name 610. Because so much information is graphically displayed in Gantt task bar area 625, it might not be easy for the user to look at a given task bar and know exactly what start and stop dates correspond to the task bar. The granularity of the dates shown on horizontal heading 620 and the vertical distance between horizontal heading 620 and a given task bar add to this difficulty. In this screen, the user has placed cursor 330 over Gantt task bar 310 associated with the supervision task causing floating information window 320 to be displayed. Now the user can see the specific information corresponding to the selected graphical control. Also shown in FIG. 6 are vertical scroll bar area 630 and horizontal scroll bar area 640. Turning to FIG. 7, this figure shows Gantt chart 600 that has been "zoomed out" to show nine months, or three quarter's, worth of information on horizontal heading 620 rather than the three months of information in FIG. 6. In this example, segment 2 of the supervision task has been graphically moved to a new location. In this example, the user selects the task bar by selecting Gantt task bar 310 with mouse cursor 330. Gantt task bar 310 is selected to be moved by the user placing mouse cursor 330 over Gantt task bar 310 and holding down the mouse button. Once Gantt task bar 310 has been selected for movement, the user simply moves the mouse to the right causing Gantt task bar 310 to move to the right as well. Information window 710 shows the starting and ending dates as Gantt task bar 310 is being moved. In this example, Gantt task bar 310 is still the same duration (21 days) but now starts on Sep. 18, 1999 rather than Aug. 7, 1999 and ends on Oct. 9, 1999 rather than Aug. 28, 1999. The data on the source server computer is correspondingly updated with the new dates shown in information window 710.

Figure 8:
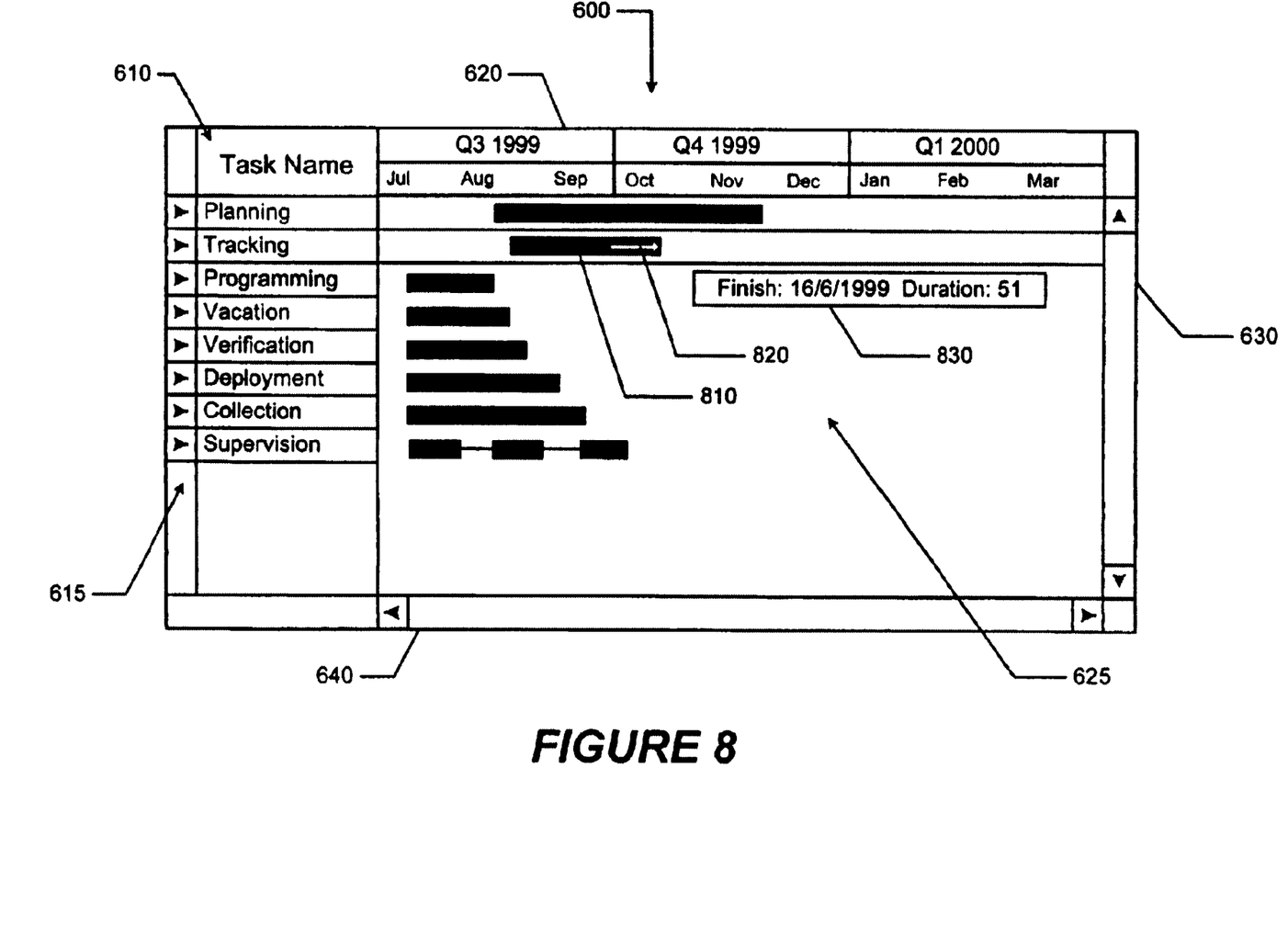
FIG. 8 is a user screen in an example embodiment showing the modification of the size of a graphic control.

FIG. 8 shows how a Gantt task bar is modified in duration. In this example, the user places the cursor towards the end of Gantt task bar 810 associated with the "tracking" task. When the cursor is placed towards an end of a segment, the cursor shape changes into a rightward or leftward pointing arrow (depending on which side of the task bar the arrow is placed) rather than the arrow shown for cursor 330 in FIGS. 6 and 7. In this example, the cursor has been placed towards the right of Gantt task bar 810 so a rightward arrow 820 is displayed. The user can either increase the size and, accordingly, the corresponding finish date, for the task by dragging the right side of Gantt task bar 820 to the right (where the corresponding dates in horizontal heading increase) or can shorten the finish date for the task by dragging the right side of Gantt task bar 820 to the left. During the dragging of Gantt task bar 820, information window 830 is displayed showing the exact finish date and the duration of the task. Correspondingly, if the left side of Gantt task bar 810 was modified, a leftward arrow would be displayed and the start date for the task could be made earlier by sliding the end of the control to the left or could be made later by sliding the end of the control to the right. A corresponding information window would be displayed giving the specific start date and duration for the task. As discussed above, the user can interact with the graphical presentation of data, such as Gantt task bar 810, and control a modification of the displayed data. The underlying data at the source server computer corresponding to the displayed data is correspondingly updated as described above. Thus, the displayed data and underlying data are "bound" to each other, and the user's interaction with controls to modify the displayed data results in the underlying data being correspondingly modified.

Figure 9:
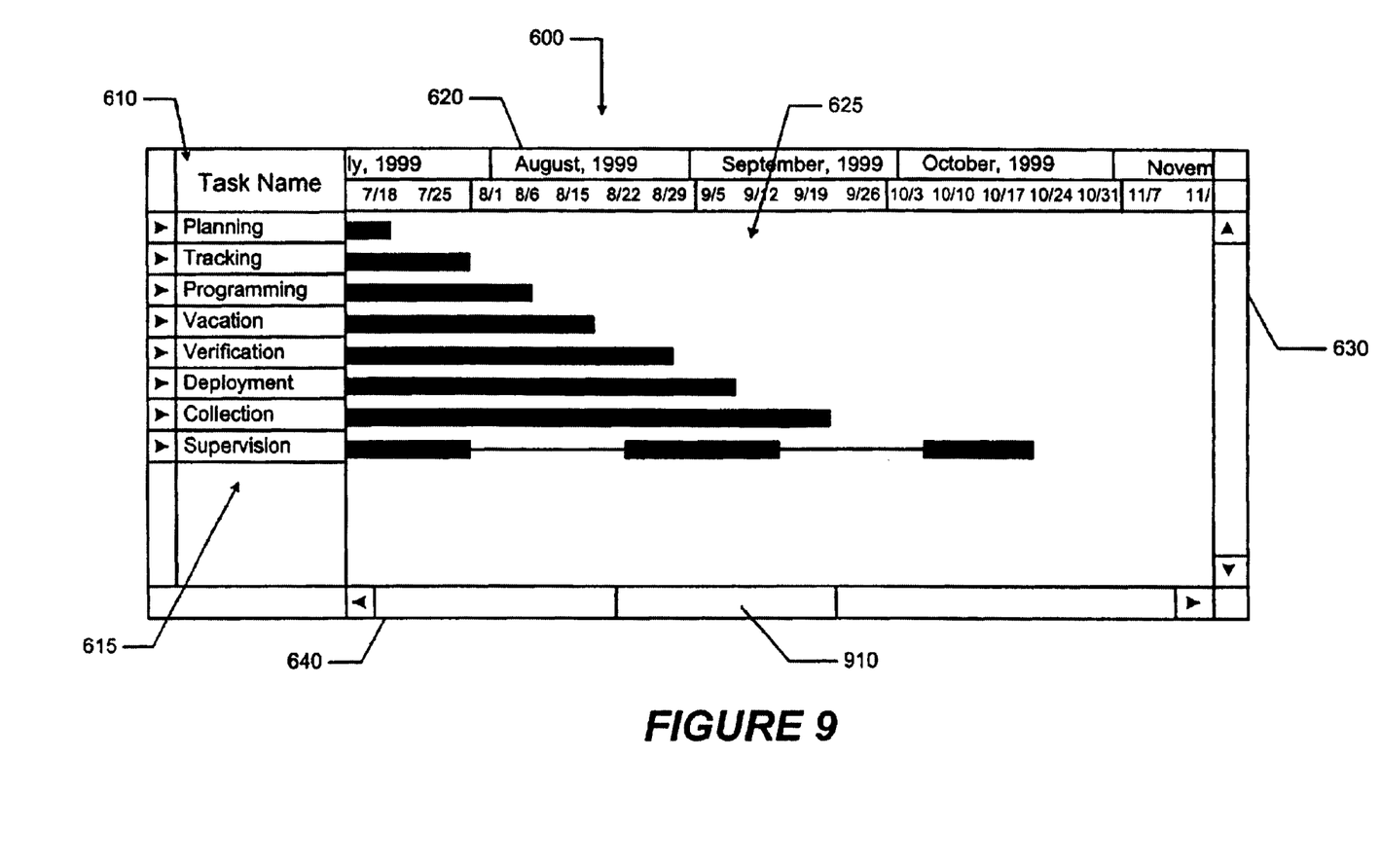
FIG. 9 is a user screen in an example embodiment showing horizontal scrolling capabilities of a graphical control area.

FIG. 9 shows Gantt chart 600 where the overall length of the project does not fit within Gantt task bar area 625. In this example, the program has cached a year's worth of data even though the display is only rendering four months of information on a screen. To view the off-screen information, the user can simply move horizontal scroll bar 910 left or right within horizontal scroll bar area 640. Additionally, the horizontal size of horizontal scroll bar 910 varies depending upon the amount of time contained in off-screen information versus the amount of time contained in Gantt task bar area 625. For example, if the project was one year long but only approximately four months of information was visible within Gantt task bar area 625, horizontal scroll bar 910 would be approximately one-third the horizontal length of horizontal scroll bar are 640.

Figure 10:
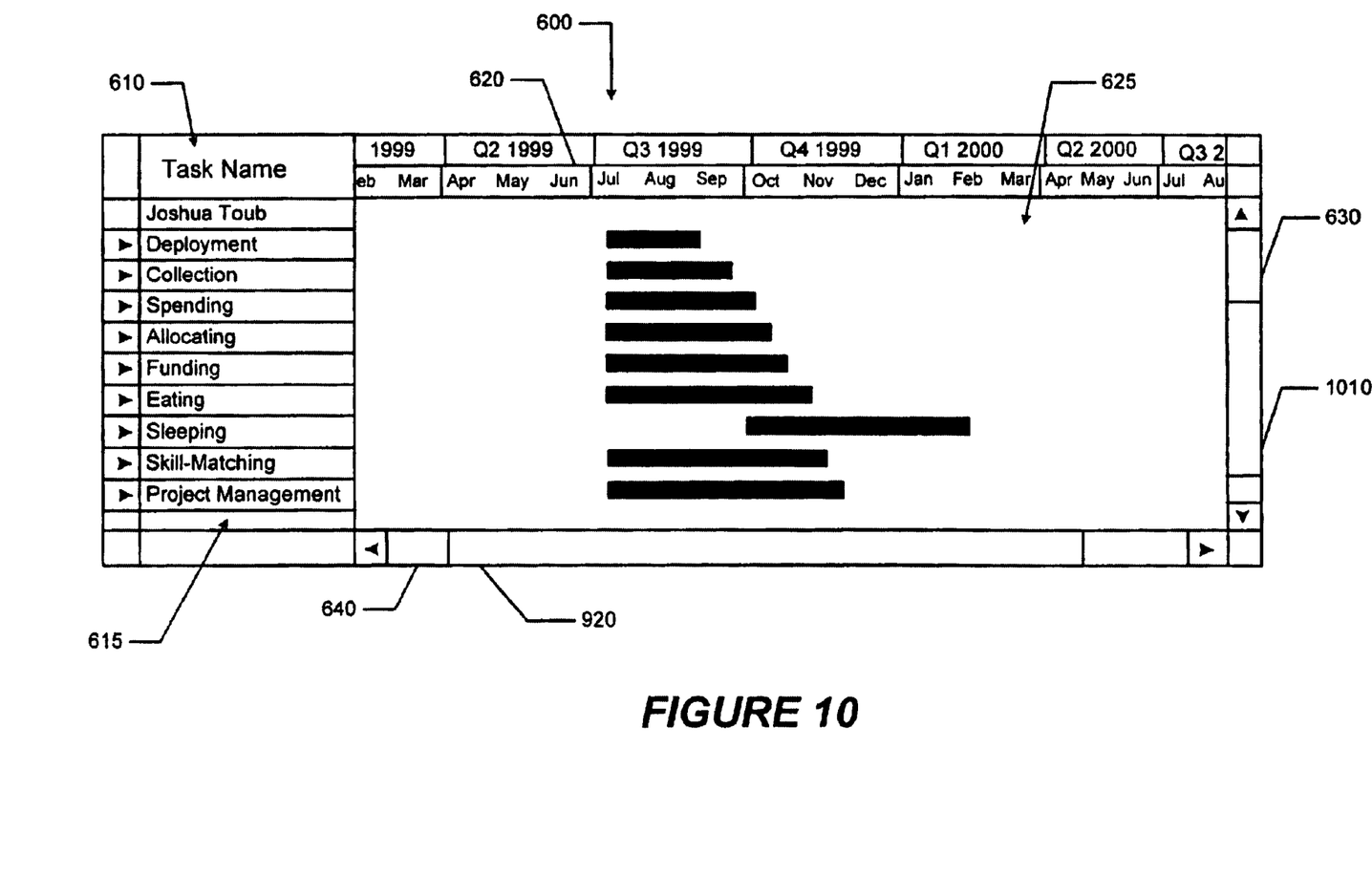
FIG. 10 is a user screen in an example embodiment showing horizontal and vertical scrolling capabilities of a graphical control area.

FIG. 10 shows the vertical counterpart to that shown in FIG. 9. Vertical scroll bar 1010 is shown because the number of tasks in task name 610 exceed the amount of tasks that can be shown in Gantt task bar area 625. Vertical scroll bar 1010 appears in vertical scroll bar area indicating to the user that additional off-screen information is available. In order to view off-screen task information, the user simply moves vertical scroll bar 1010 up or down to view the off-screen information. Like the horizontal scroll bar, the amount of off-screen vertical information can be conveyed to the user by having the vertical length within vertical scroll bar area 630 be proportional to the amount of off-screen vertical information. For example, if only half the tasks are visible within Gantt taskbar area 625, then the vertical height of vertical scroll bar 1010 would be one-half of the vertical length of vertical scroll bar area 630.

Thus, in one embodiment utilization of interactive data-bound controls allows a user operating a client computer to interact with displayed controls, such as manipulatable graphically displayed data, and modify the data associated with the displayed controls. The data underlying the displayed controls, which can be located on a source server computer or in the code which defines the display, is modified corresponding to the user's interaction. Thus, in one embodiment, underlying data which is bound to displayed data is modifiable by a user interaction with controls that allow the user to modify the display data. The underlying data can be published to other user's through, for example, Web pages generated using the modified underlying data. Thus, current information is available for review by many users.

Figure 11:
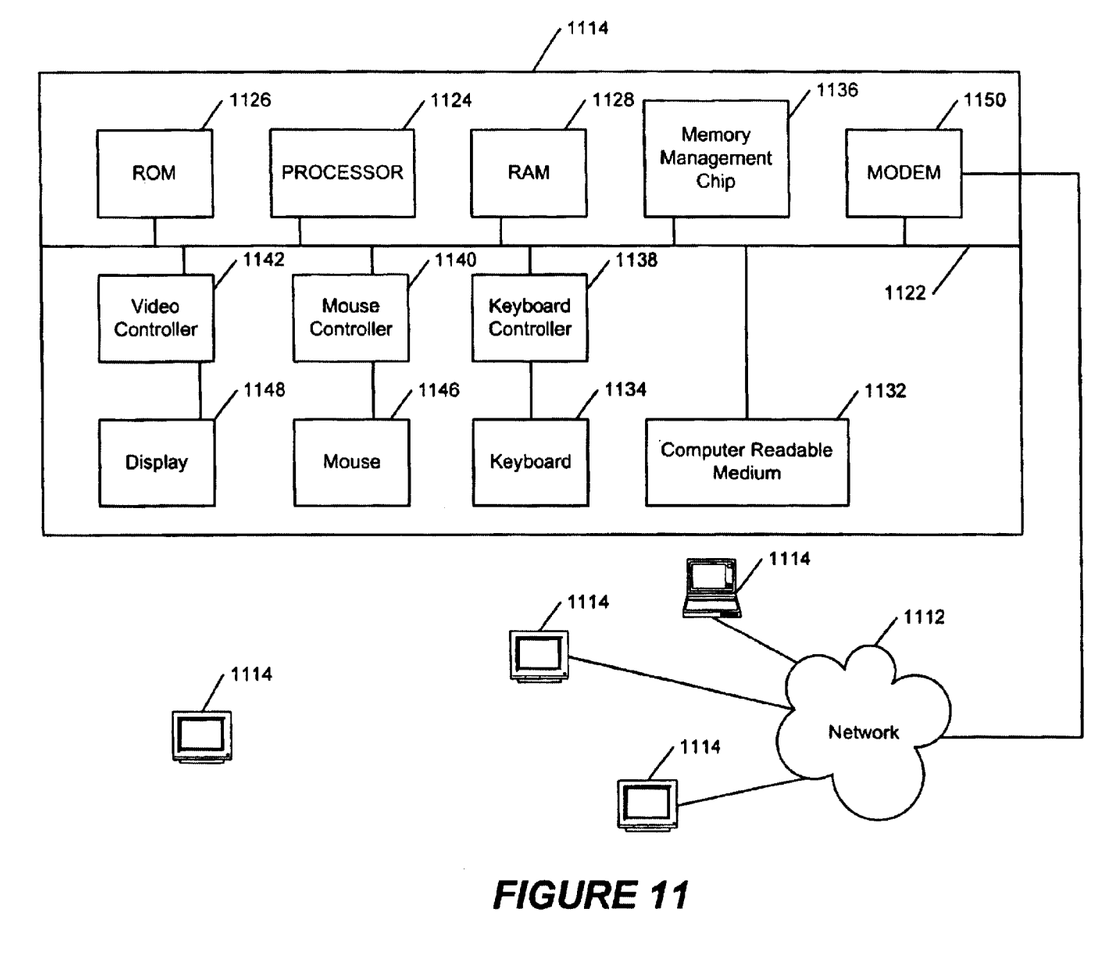
FIG. 11 is a block diagram illustrating a networked and stand alone computers and example components thereof.

FIG. 11 depicts several computers 1114. Computers 1114 may be in data communication with one or more other computers 1114 via a network 1112, such as the Internet, or may be in a stand alone configuration. In one embodiment, each computer 1114 includes one or more system buses 1122 placing various components of the system in data communication. For example, system bus 1122 allows data communication between processor 1124 and both a read only memory (ROM) 1126 and random access memory (RAM) 1128. The ROM 1126 contains among other code, the Basic Input-Output system (BIOS) which controls basic hardware operation such as the interaction with peripheral components such as keyboard 1134. Application computer programs resident with a computer 1114 are generally stored on and accessed via a computer readable medium 1132, such as a hard disk drive, optical drive, floppy disk drive, compact disk, or other storage medium. Additionally, application may be in the form of electronic signals modulated in accordance with the application and data communication technology when accessed via network 1112. In one embodiment, interactive data-bound controls are generated by an application computer program that may be accessed on a stand alone computer or via computer to computer data communication via network 1112. The RAM 1128 is the main memory into which the operating system and application programs are loaded and generally affords at least 32 megabytes of memory space. Through data communication on system bus 1122, memory management chip 1136 control direct memory access (DMA) operations. DMA operations include passing data between the RAM 1128 and the mass storage memory 1132. Also in data communication with the system bus 1122 are various I/O controllers; a keyboard controller 1138, a mouse controller 1140 and a video controller 1142. The keyboard controller 1138 provides a hardware interface for the keyboard 1134, the mouse controller 1140 provides the hardware interface for the keyboard 1134, or other point and click device, and the video controller 1143 provides a hardware interface for a display 1148. A modem 1150 or network circuitry (not shown) enables networked computers 1114 to conduct data comunuunication over a network 1112 via any of various data communication technologies such as digital subscriber lines ("DSL"), asynchronous DSL, ISDN, or plain-old-telephone. The RAM 1128 also supports a number of Internet access tools, including, for example, an HTTP-compliant Web browser having a JavaScript interpreter, such as Netscape Navigator 3.0, Microsoft Explorer 3.0, or the like.

Those skilled in the art will readily implement the steps necessary to provide the structures and the methods disclosed herein, and will understand that the process parameters and sequence of steps are given by way of example only and can be varied to achieve the desired structure as well as modifications that are within the scope of the invention. For example, various other markup languages in addition to, or instead of, DHTML may be utilized with the present invention. Variations and modifications of the embodiments disclosed herein may be made based on the description set forth herein, without departing from the spirit and scope of the invention as set forth in the following claims.

What is claimed is:

1. A method for synchronizing client-side and server-side data using an interactive data-bound graphical control, the method comprising:

generating uncompiled computer code corresponding to an interactive data-bound graphical control, wherein the computer code corresponding to the interactive data-bound graphical control resides entirely within a web page and operates to display the interactive data-bound graphical control;

binding the interactive data bound graphical control to data stored in a database; and providing the web page to a client computer system, to enable the client computer system to interpret the computer code corresponding to the interactive data-bound graphical control using a web browser application of the client computer system and thereby:

display the interactive data-bound graphical control;

determine a user interaction with the interactive data-bound graphical control; and provide information to a server computer system, coupled to the client computer system, to enable the database to synchronize the interactive data-bound graphical control and the data stored in the database in response to the user interaction with the interactive data-bound graphical control.

2. The method of claim 1, further comprising:

calling an event handling routine corresponding to the user interaction with the interactive data-bound graphical control.

3. The method of claim 1 wherein generating uncompiled computer code comprises generating dynamic hypertext markup language code.

4. A method for synchronizing client-side and server-side data using interactive data-bound graphical control, the method comprising:

connecting a first computer system to communicate with a second computer system, wherein the second computer system is coupled to a database;

receiving in the first computer system a web page from the second computer system, the web page having uncompiled computer code corresponding to an interactive data-bound graphical control wherein (i) the computer code corresponding to the interactive data-bound graphical control resides entirely within the web page and operates to display the interactive data-bound graphical control and (ii) the interactive data-bound graphical control is bound to data stored in the database;

interpreting the uncompiled computer code with a web browser;

displaying the interactive data-bound graphical control on the first computer system, wherein the interactive data-bound graphical control includes a representation of the bound data;

interacting with the interactive data-bound graphical control to modify the representation of the bound data; and synchronizing the modified representation of the bound data with the data stored in the database.

5. The method of claim 4, further comprising:

forming the graphical control by interpreting dynamic hypertext markup language in the web browser; and binding the interactive data-bound graphical control to a database, wherein the database includes the bound data.

6. The method of claim 4 wherein synchronizing the modified representation of the bound data with the data stored in the database comprises:

determining a user action with the interactive data-bound graphical control resulting in a modification of the representation of the bound data;

calling an event handling routine corresponding to the user action; and communicating to the second computer system the modification of the representation of the bound data; and changing the bound data to correlate the modification of the representation of the bound data with the data stored in the database.

7. A method for synchronizing client-side and server-side data using interactive data-bound graphical control, the method comprising:

loading a web page using a browser application of a client computer system, wherein the web page includes uncompiled code for generating an interactive data-bound graphical control corresponding to control data residing in a database accessible via a server computer system coupled to the client computer system, wherein loading the web page further comprises interpreting the uncompiled code with the browser application without downloading any additional code;

displaying the graphical control within a web browser display;

interacting with the graphical control to make one or more particular data selections from a choice of data selections presented by the graphical control;

determining one or more particular data selections; and providing information to the server computer system using an event handler of the browser application to enable the server computer system to synchronize the control data with the one or more particular selections in response to the one or more particular data selections.

8. The method of claim 7 wherein the graphical control comprises a GANTT task bar.

9. A computer readable medium having a set of instructions for enabling a computer system to:

generate uncompiled computer code corresponding to an interactive data-bound graphical control, wherein the computer code corresponding to the interactive data-bound graphical control resides entirely within a web page and operates to display the interactive data-bound graphical control;

bind the interactive data-bound graphical control to data stored in a database;

transmit the web page to a client computer system, to enable the client computer system to interpret the computer code corresponding to the interactive data-bound graphical control using a web browser application of the client computer system and thereby:

display the interactive data-bound graphical control;

determine a user interaction with the interactive data-bound graphical control; and modify the interactive data-bound graphical control and the data stored in the database and bound to the interactive data-bound graphical control in response to the user interaction.

10. The computer readable medium of claim 9, wherein the instructions to determine a user interaction comprise instructions to enable the client computer system to call an event handling routine corresponding to the user interaction.

11. The computer readable medium of claim 9, wherein the computer readable medium is selected from the group comprising a hard disk drive, optical drive, floppy disk drive, compact disk, electronic signals representing the instructions.

12. A computer readable medium having a set of instructions for performing the following:

connecting a first computer system to communicate with a second computer system, wherein the second computer system is coupled to a database;

receiving in the first computer system a web page from the second computer system, the web page having uncompiled computer code corresponding to an interactive data-bound graphical control, wherein (i) the computer code corresponding to the interactive data-bound graphical control resides entirely within the web page and operates to display the interactive data-bound graphical control and (ii) the interactive data-bound graphical control is bound to data stored in the database;

interpreting the uncompiled computer code with a web browser;

displaying the interactive data-bound graphical control on the first computer system, wherein the interactive data-bound graphical control includes a representation of the bound data;

facilitating interaction with the interactive data-bound graphical control to modify the representation of the bound data; and synchronizing the modified representation of the bound data with the data stored in the database.

13. The computer readable medium of claim 12, wherein the set of instructions further perform the following:
   forming the graphical control by interpreting dynamic hypertext markup language in the web browser; and
   binding the interactive data-bound graphical control to a database, wherein the database includes the bound data.

14. The computer readable medium of claim 12, wherein the set of instructions further perform the following:
   determining a user action with the interactive data-bound graphical control resulting in a modification of the representation of the bound data;
   calling an event handling routine corresponding to the user action;
   communicating to the second computer system the modification of the representation of the bound data; and
   changing the bound data to correlate the modification of the representation of the bound data with the data stored in the database.

15. An apparatus to synchronize client-side and server-side data using interactive data-bound graphical control, the apparatus comprising:
   means for loading a web page, using a browser application of a client computer system, wherein, the web page includes uncompiled code for generating an interactive data-bound graphical control corresponding to control data residing in a database accessible via a server computer system coupled to the client computer system;
   means for displaying the graphical control on a browser without downloading any additional code;
   means for determining one or more particular data selections; and
   means for providing information to the server computer system, and without downloading any additional code, to enable the server computer system to synchronize the control data with the one or more particular selections in response to the one or more particular data selections.

16. The apparatus of claim 15 wherein the page is a web page and the browser is a web browser.

17. The apparatus of claim 15 further comprising:
   means for modifying the interactive data-bound graphical control in response to the one or more particular data selections.

18. A computer readable medium having computer readable code encoded thereon to render an interactive data-bound graphical control within a displayed web page and synchronize data represented by the data-bound graphical control and data in a remote database, the computer readable code comprising uncompiled code to:
   render an interactive data-bound graphical control corresponding to control data stored on a server computer system and wherein the web page does not contain an applet corresponding to the interactive data-bound graphical control or control data modification operations;
   display the interactive, data-bound graphical control using a web browser without downloading additional code include including applet code;
   detect a user action with the interactive data-bound graphical control; and
   modify the interactive data-bound graphical control and the control data in response to the user action without downloading additional include including applet code.

19. A method for processing data requests received at a server computer system, the method comprising:
   generating uncompiled computer code corresponding to an interactive data-bound graphical control, wherein the computer code (i) corresponding to the interactive data-bound graphical control resides entirely within a web page and (ii) operates to display the interactive data-bound graphical control on a client computer;
   binding the interactive data-bound graphical control to data stored in a database that is accessible by the server computer system;
   transmitting the web page to a client computer system, to enable the client computer system to interpret the computer code corresponding to the interactive data-bound graphical control using a web browser application of the client computer system and thereby:
      display the interactive data-bound graphical control; and
      determine a user action with the interactive data-bound graphical control; and
   modifying the interactive data-bound graphical control and the data stored in the database and bound to the interactive data-bound graphical control in response to the user action.

20. The method of claim 19 wherein the interactive data-bound graphical control represents a GANTT task bar.

21. A computer readable medium including program instructions to process data requests received at a server computer, the computer readable medium comprising:
   program instructions for generating uncompiled computer code corresponding to an interactive data-bound graphical control, the computer code (i) corresponding to the interactive data-bound graphical control resides entirely within a web page and (ii) operates to display the interactive data-bound graphical control on a client computer;
   program instructions for binding the interactive data-bound graphical control to data stored in a database that is accessible by the server computer system;
   program instructions for transmitting the web page to a client computer system, to enable the client computer system to interpret the computer code corresponding to the interactive data-bound graphical control using a web browser application of the client computer system and thereby:
      display the interactive data-bound graphical control; and
      determine a user action with the interactive data-bound graphical control; and
   program instructions for modifying the interactive data-bound graphical control and the data stored in the database and bound to the interactive data-bound graphical control in response to the user action.

22. The computer readable medium of claim 21 wherein the interactive data-bound graphical control represents a GANTT task bar.

23. The computer readable medium of claim 21, further comprising:
   program instructions for storing the control data in a database.

24. A system for synchronizing client-side and server-side data using interactive data-bound graphical control, the system comprising:
   a server computer system having a processor;
   computer-readable program instructions executable by the processor of the server system and operable to:

generate uncompiled computer code corresponding to an interactive data-bound graphical control, the computer code corresponding to the interactive data-bound graphical control resides entirely within a web page and is accessible by the server computer system, wherein the computer code operates to display the interactive data-bound graphical control on a client computer;

bind the interactive data-bound graphical control to data stored in a database that is accessible by the server computer system;

transmit the web page to a client computer system, to enable the client computer system to interpret the computer code corresponding to the interactive data-bound graphical control using a web browser application of the client computer system and thereby:

display the interactive data-bound graphical control; and determine a user action with the interactive data-bound graphical control; and modify the interactive data-bound graphical control and the data stored in the database and bound to the interactive data-bound graphical control in response to the user action.

25. The system of claim 24, wherein the computer-readable program instructions are further operable to:

form the graphical control solely by interpreting markup language commands in the web browser.

26. The system of claim 24 further comprising:

a client computer system having computer readable instructions operable to:

receive in the first computer system a web page from the second computer system, the web page having uncompiled computer code corresponding to an interactive data-bound graphical control, wherein (i) the computer code corresponding to the interactive data-bound graphical control resides entirely within the web page and operates to display the interactive data-bound graphical control and (ii) the interactive data-bound graphical control is bound to data stored in the database;

interpret the uncompiled computer code with a web browser;

display the interactive data-bound graphical control on the first computer system, wherein the interactive data-bound graphical control includes a representation of the bound data;

interact with the interactive data-bound graphical control to modify the representation of the bound data;

synchronize the modified representation of the bound data with the data stored in the database, call an event handling routine corresponding to the user action.

27. A system for synchronizing client-side and server-side data using interactive data-bound graphical control, the system comprising:

a first computer system coupled to a second computer system, wherein the second computer system is coupled to a database;

computer readable program instructions operable to:

receive in the first computer system a web page from the second computer system, the web page having uncompiled computer code corresponding to an interactive data-bound graphical control, wherein (i) the computer code corresponding to the interactive data-bound graphical control resides entirely within the web page and operates to display the interactive data-bound graphical control and (ii) the interactive data-bound graphical control is bound to data stored in the database;

interpret the uncompiled computer code with a web browser;

display the interactive data-bound graphical control on the first computer system, wherein the interactive data-bound graphical control includes a representation of the bound data;

interact with the interactive data-bound graphical control to modify the representation of the bound data; and synchronize the modified representation of the bound data with the data stored in the database.

28. The system of claim 27, wherein the computer-readable program instructions are further operable to:

form the interactive data-bound graphical control solely by interpreting markup language commands in the web browser; and bind the interactive data-bound graphical control to data included in a database.

29. The system of claim 27, wherein the computer-readable program instructions are further operable to:

determine a user action, wherein the determining occurs within a browser;

call an event handling routine corresponding to the user action; and bind the one or more graphical controls to a database, wherein the database includes the data.

30. A system for synchronizing client-side and server-side data using an interactive data-bound graphical control, the system comprising:

a client computer system;

computer-readable program instructions operable to:

load a web page using a browser application of a client computer system, wherein the web page includes uncompiled code for generating an interactive data-bound graphical control corresponding to control data residing in a database accessible via a server computer system coupled to the client computer system, wherein loading the web page further comprises interpreting the uncompiled code with the browser application without downloading any additional code;

display the graphical control within a web browser display;

interact with the graphical control to make one or more particular data selections from a choice of data selections presented by the graphical control;

determine one or more particular data selections corresponding to a user action; and provide information to the server computer system using an event handler of the browser application to enable the server computer system to synchronize the control data with the one or more particular selections in response to the user action.

31. The system of claim 30 wherein the graphical control comprises a GANTT task bar.

* * * * *